(12) United States Patent
Sharma et al.

(10) Patent No.: US 10,009,253 B2
(45) Date of Patent: Jun. 26, 2018

(54) PROVIDING SHARED RESOURCES TO VIRTUAL DEVICES

(71) Applicant: CISCO TECHNOLOGY, INC., San Jose, CA (US)

(72) Inventors: Samar Sharma, San Jose, CA (US); Mouli Vytla, San Jose, CA (US); Rajendra Kumar Thirumurthi, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 313 days.

(21) Appl. No.: 14/802,868

(22) Filed: Jul. 17, 2015

(65) Prior Publication Data

US 2016/0315815 A1 Oct. 27, 2016

Related U.S. Application Data

(60) Provisional application No. 62/152,420, filed on Apr. 24, 2015.

(51) Int. Cl.
*H04L 12/751* (2013.01)
*H04L 12/24* (2006.01)

(52) U.S. Cl.
CPC ........ *H04L 45/026* (2013.01); *H04L 41/0806* (2013.01); *H04L 41/0846* (2013.01)

(58) Field of Classification Search
None
See application file for complete search history.

(56) References Cited

U.S. PATENT DOCUMENTS

| 7,756,027 | B1 | 7/2010 | Reddy et al. |
| 7,992,149 | B2 | 8/2011 | Carollo et al. |
| 8,856,419 | B2 | 10/2014 | Corrigan et al. |
| 2005/0135357 | A1* | 6/2005 | Riegel ............... H04L 45/583 370/389 |
| 2008/0144627 | A1* | 6/2008 | Ballantyne ........ H04L 12/4633 370/392 |
| 2009/0245137 | A1* | 10/2009 | Hares ................ H04L 41/046 370/254 |

* cited by examiner

*Primary Examiner* — Kevin Bates
*Assistant Examiner* — Lesa Kennedy

(57) ABSTRACT

The present disclosure relates to providing shared resources to virtual devices on a network switch. In one example, a switch comprises a plurality of virtual device contexts (VDCs) and a default virtual device context (DVDC). The DVDC stores configuration data that identifies a network resource. The DVDC transmits a reference to the configuration data to each of the plurality of VDCs. Each of plurality of VDCs receives the reference from the DVDC. When the DVDC receive, from the at least one of the plurality of VDCs, a request to access the configuration data via the reference, the DVDC transmits at least a portion of the configuration data to the at least one of the plurality of VDCs. The at least the portion of the configuration data is operable to initiate a connection between the at least one of the plurality of VDCs and the network resource.

20 Claims, 8 Drawing Sheets

PROVIDING SHARED RESOURCES TO VIRTUAL DEVICES

CROSS-REFERENCE TO RELATED APPLICATIONS

This application claims the benefit of priority under 35 U.S.C. § 119(e) to U.S. Provisional Application Ser. No. 62/152,420, entitled "PROVIDING SHARED RESOURCES TO VIRTUAL DEVICES" filed Apr. 24, 2015, which is hereby incorporated by reference in its entirety.

TECHNICAL FIELD

This disclosure relates in general to the field of communications and, more particularly, to providing shared resources to virtual devices.

BACKGROUND

Data centers are increasingly used by enterprises for effective collaboration, data storage, and resource. A typical data center network contains myriad network elements including servers, loadbalancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
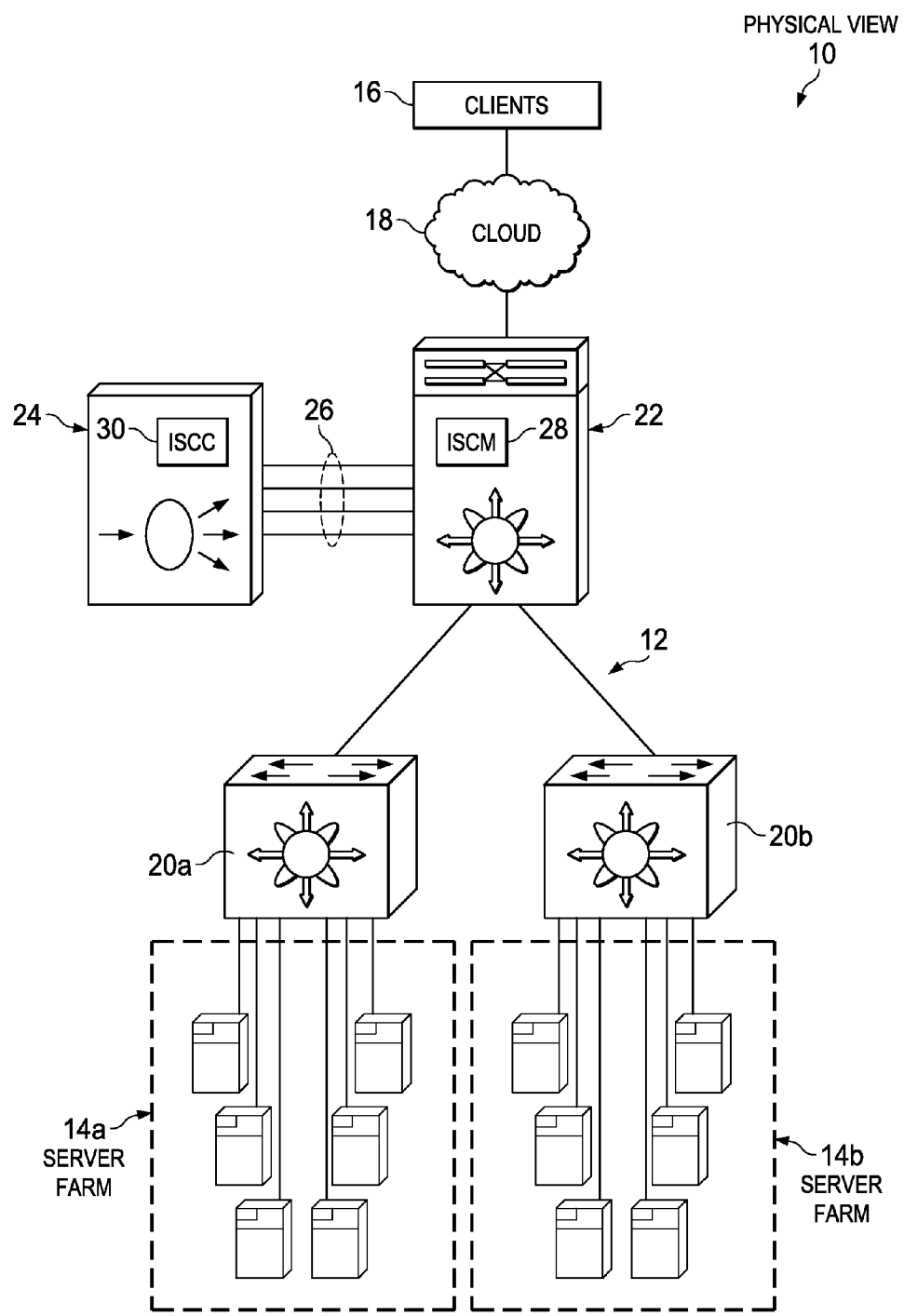
FIG. 1A is a simplified schematic diagram illustrating a physical view of a system for providing shared resources in a network environment in accordance with one embodiment.

In one example, a method comprises storing, by a default virtual device context (DVDC) located on a switch, configuration data that identifies a network resource; transmitting a reference to the configuration data to a plurality of virtual device contexts (VDCs) located on the switch; receiving, from one of the plurality of VDCs, a request to access the configuration data via the reference; and transmitting, based on the request, at least a portion of the configuration data from the DVDC to the one of the plurality of VDCs, wherein the at least the portion of the configuration data is operable to initiate a connection between the one of the plurality of VDCs and the network resource.

In other examples, a switch comprises at least one memory element; at least one processor operably coupled to the at least one memory; a plurality of virtual device contexts (VDCs), wherein at least one the plurality of VDCs is associated with a first processor of the at least one processor and a first memory element of the at least one memory element; a default virtual device context (DVDC), wherein the DVDC is associated with a second processor of the at least one processor and second memory element of the at least one memory element, and wherein the DVDC comprises one or more instructions, that when executed by the second processor configure the second processor to perform operations comprising: storing configuration data that identifies a network resource; transmitting a reference to the configuration data to the plurality of VDCs; receiving, from the at least one of the plurality of VDCs, a request to access the configuration data via the reference; and transmitting, based on the request, at least a portion of the configuration data to the at least one of the plurality of VDCs, wherein the at least the portion of the configuration data is operable to initiate a connection between the at least one of the plurality of VDCs and the network resource.

In further examples, a computer-readable non-transitory medium comprises one or more instructions that, when executed on a processor, configure the processor to perform one or more operations comprising: storing, by a default virtual device context (DVDC) located on a switch, configuration data that identifies a network resource; transmitting a reference to the configuration data to a plurality of virtual device contexts (VDCs) located on the switch; receiving, from one of the plurality of VDCs, a request to access the configuration data via the reference; and transmitting, based on the request, at least a portion of the configuration data from the DVDC to the one of the plurality of VDCs, wherein the at least the portion of the configuration data is operable to initiate a connection between the one of the plurality of VDCs and the network resource.

In yet other examples, a switch stores configuration data that identifies a network resource. The configuration data is stored in a default VDC on the switch and the configuration data is not stored by any of a plurality of other VDCs on the switch. Moreover, each of the plurality of other VDCs accesses the configuration data using a reference to the configuration data.

In still other examples, a method comprises receiving, by an virtual device in a network element, a message from one or more other virtual devices in the network element, wherein the virtual device facilitates communication between the one or more other virtual devices and a computational resource (e.g., a network resource); and forwarding, by the virtual device on the network element, the message to the computational resource for processing. The virtual device on the network element may initiate a probe to the computational resource. The method may also comprise determining, based on the probe, whether the computational resource is operational; when it is determined that the computational resource is operational, forwarding the message to the computational resource; and when it is determined that the computational resource is operational, transmitting an error message to the one or more other virtual devices. An apparatus may perform the method. In addition, a computer-readable non-transitory medium may comprise one or more instructions that, when executed on a processor, configure the processor to perform the method.

EXAMPLE EMBODIMENTS

A network switch ("switch") may be configured as one or more virtual device contents (VDCs), which allow the switch to be virtualized at the device level (e.g., as multiple virtualized (logical) devices). Thus, each VDC is a virtual device on the switch. A VDC may behave as if it were a standalone switch (acting independently from other VDCs, which may be provisioned on the same switch). In addition, a VDC may appear, to external users, to be a separate (standalone) device. However, the VDC is provisioned by the switch and is therefore is integrated with (and not separate from) the switch.

Each VDC may utilize resources accessible in a network. Such resources may include access to (and use of) network elements, bandwidth, processing power (e.g., CPU cycles), data storage, firewalls, server farms, any other resource accessible in a network environment, or a group of any one or more of the foregoing. For example, if several VDCs utilize a server farm (e.g., for processing data), the server farm is a shared resource and is individually accessed by each of the VDCs. A resource may include a single physical device that is configured as one or more virtual resources. In other examples a resource may include a plurality of physical devices that are configured as one or more virtual resources. A resource (or a virtual resource) may be shared by a plurality of VDCs. The VDCs may or may not be aware that other VDCs are sharing the resources (e.g., each VDC may not have access to information identifying that the resource is shared with other VDCs and/or each VDC may not have access to an identity of other VDCs that use the resources).

Traditional systems for sharing resources between different virtual devices separately configure access information for a shared resource on each virtual device. For example, for a switch that contains 'n' number of virtual devices (where 'n' is a integer greater than zero), the access information is separately configured on each of the virtual devices (i.e., the access information is stored n times on the switch, stored once in each virtual device). Although the access information stored in each virtual device is identical to that stored in other virtual devices, each of the virtual devices on the switch receives a separate copy of the access information (e.g., the access information may be stored in a configuration file). A problem is that the access information, stored in each virtual device, is separate and independent from the access information stored in each other device. As a result, the access information is, in effect, duplicated n times (although all of the virtual devices may reside on a single physical switch). Thus, the stitch redundantly stores multiple copies of the access information. Moreover, any changes to the access information for the shared resource requires that such changes be made in each of the plurality of virtual devices (i.e., the changes are duplicated n times). The complexity of managing the shared resources increases as the number of virtual devices on the switch increase. Such traditional system may, in effect, limit the number of virtual devices that can be deployed on a single virtual switch (e.g., because the computational required to manage a large number of virtual devices may exceed the computational capacity of the switch on which the virtual devices reside).

Individually managing the access information for the shared resource by each VDC may have an adverse affect on the performance of a network. For example, if several VDCs transmit and receive status-monitoring messages with the resource (e.g., a "keep alive" or "keepalive" message to check whether the shared resource is operational), then the traffic associated with such messages may create congestion in the network (e.g., decreasing the performance of the network and/or slowing other traffic that traverses the network). Moreover, the traffic may be redundant since the operational status from a single shared resource may need to be broadcast to each VDC that has access to the shared resource. A shared resource may include a single physical device (or set of physical devices) that is configured as one or more virtual resources. The virtual resources may be shared with a plurality of VDCs. In such a case, each VDC may appear (from the perspective of each of the VDCs) to have access to a separate resource (i.e., the VDCs are not aware that they are sharing a single physical resource). Thus, the traffic congestion may be created by data that is being transmitted to and/or transmitted from a same physical resource (e.g., therefore may be redundant to retrieve the status multiple times for the same physical resource).

Moreover, providing each of the VDCs (where each of the VDCs are provisioned on a common switch) with a direct, individual copy of the access information for a shared resource may have an adverse affect on the performance the switch on which the VDCs are provisioned. Since each VDC may operate as an individual (virtual) switch, the access information for shared resources may be individually configured on each VDC. Such configuration (e.g., a configuration file) may consume resources on the switch such as data storage (e.g., due to each VDC individually storing configuration data/settings, especially when the configuration data/settings are the same in each VDC), processing power (e.g., due to each VDC individually processing status messages), and other computational resources accessible by and/or local to the switch. Again, since data (e.g., status messages) from the shared resource may be duplicated and broadcast to multiple VDCs on a single switch, each VDC on the switch may redundantly store and process the same (duplicate) data. Such redundant storage and processing of the data may be undesirable since it may (unnecessarily) consume computational resources on the switch. Thus, from the perspective of the switch (on which each of the VDCs is provisioned), the same or similar data may be processed and stored multiple times.

A solution to the above issues (and others) provided in the current disclosure is to centralize access to a shared resource in a single VDC (e.g., a default VDC (DVDC)), which facilitates access to and communication with a shared resource with other VDCs on a switch. It is noted that the terms 'default virtual device context', 'default VDC', and 'DVDC' are used interchangeably throughout this disclosure. By centralizing, in a default VDC, storage of the access information for the resource and monitoring of the resource (e.g., to enable sharing the resource between VDCs), a switch (on which the VDCs are provisioned) operates more efficiently than having each VDC individually store the access information and monitor the resource at least because it reduces redundant processing and storage of data associated with the resource. Thus, the operation of a default VDC (DVDC) and/or a VDC, as disclosed herein, improves the functioning of the switch itself at least by improving the storage and computational efficiency of the switch. For example, using the approach disclosed herein, a shared resource may transmit status messages only to a single VDC (i.e., the DVDC) instead of a traditional approach, which may require transmitting status messages to multiple VDCs on a switch. The DVDC may communicate with the other VDCs on the switch regarding the resources. For example, the DVDC may transmit information associated with the resource to one or more of the other VDCs (e.g., where the one or more of the other VDCs have rights to access and/or utilize the resource). The one or more of the other VDCs may receive the information from the DVDC. Likewise, the one or more of the other VDCs may transmit information associated with the resource to the DVDC. The DVDC may receive information from the one or more of the other VDCs (e.g., where the one or more of the VDCs have rights to access and/or utilize the resource). The information may be a request message, a response message, an instruction (e.g., for execution by the resource), data retrieved by a probe, or any message operable to instruct or monitor operations performed by the resource.

In some examples, the DVDC monitors an operational status of a shared resource. Such status information may be received by the DVDC from the shared resource. In further examples, only the DVDC performs the monitoring (and the one or more of the other VDCs on the switch do not perform the monitoring). The DVDC may initiate (and execute) a probe, which is operable to retrieve at least an operational status of the resource. A probe is inclusive of an active computer network measurement technology (e.g., IP Service Level Agreements (IP SLAs)) that is operable to test or measure a resource and/or network. Such a probe may utilize a variety of protocols, e.g., to execute commands such as echo, connect, lookups, keepalive messages, or downloads. For example, the protocols may include any one or more of (but are not limited to) Internet Control Message Protocol (ICMP), Transmission Control Protocol (TCP), User Datagram Protocol (UDP), and/or other protocols operable to test or measure network attributes. In one example, the DVDC implements the probe by transmitting a keepalive messages to the shared resource (i.e., a resource that is shared between each of the VDCs on the switch).

Figure 1B:
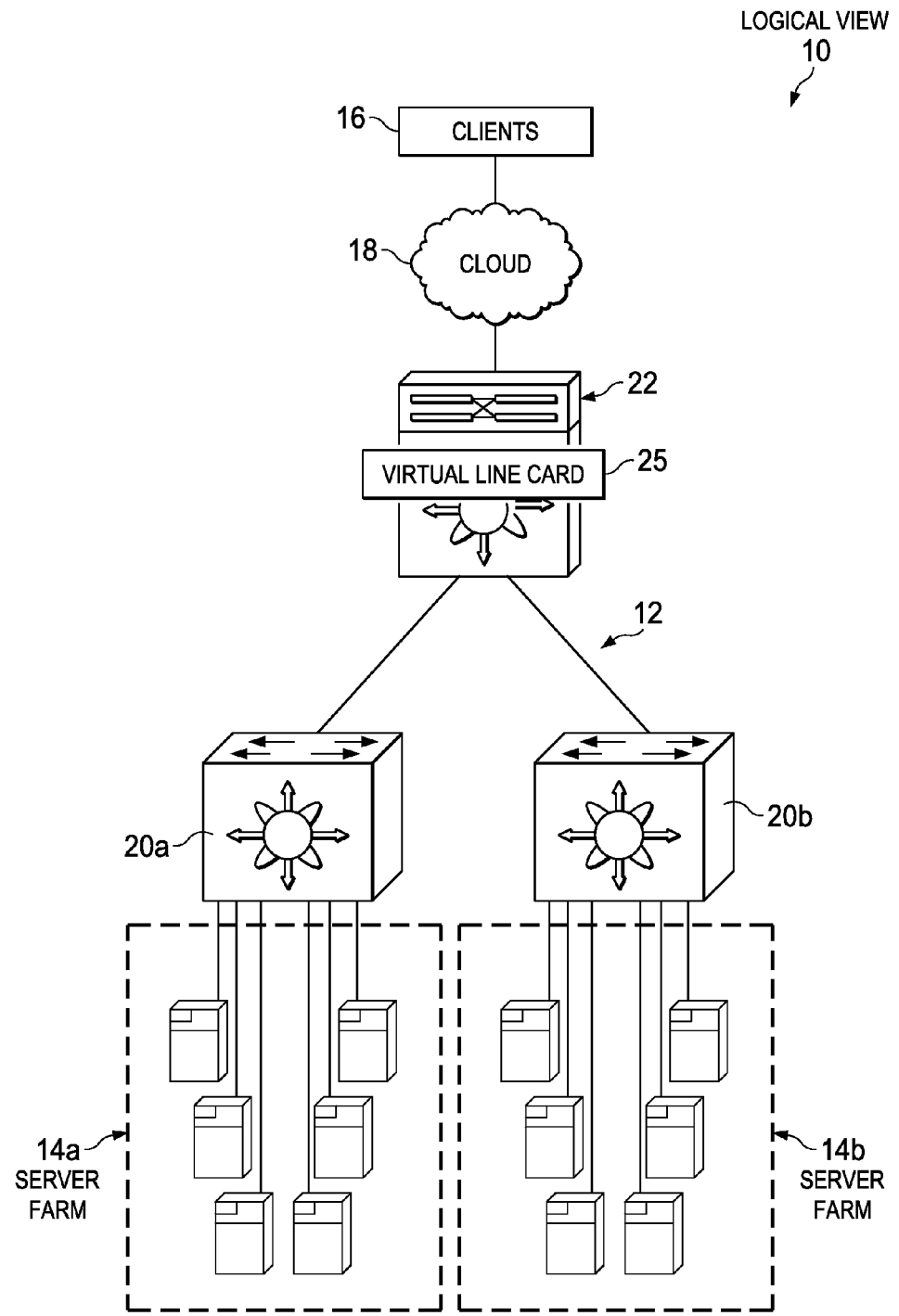
FIG. 1B is a simplified schematic diagram illustrating a logical view of the system in accordance with the embodiment.
Figure 2:
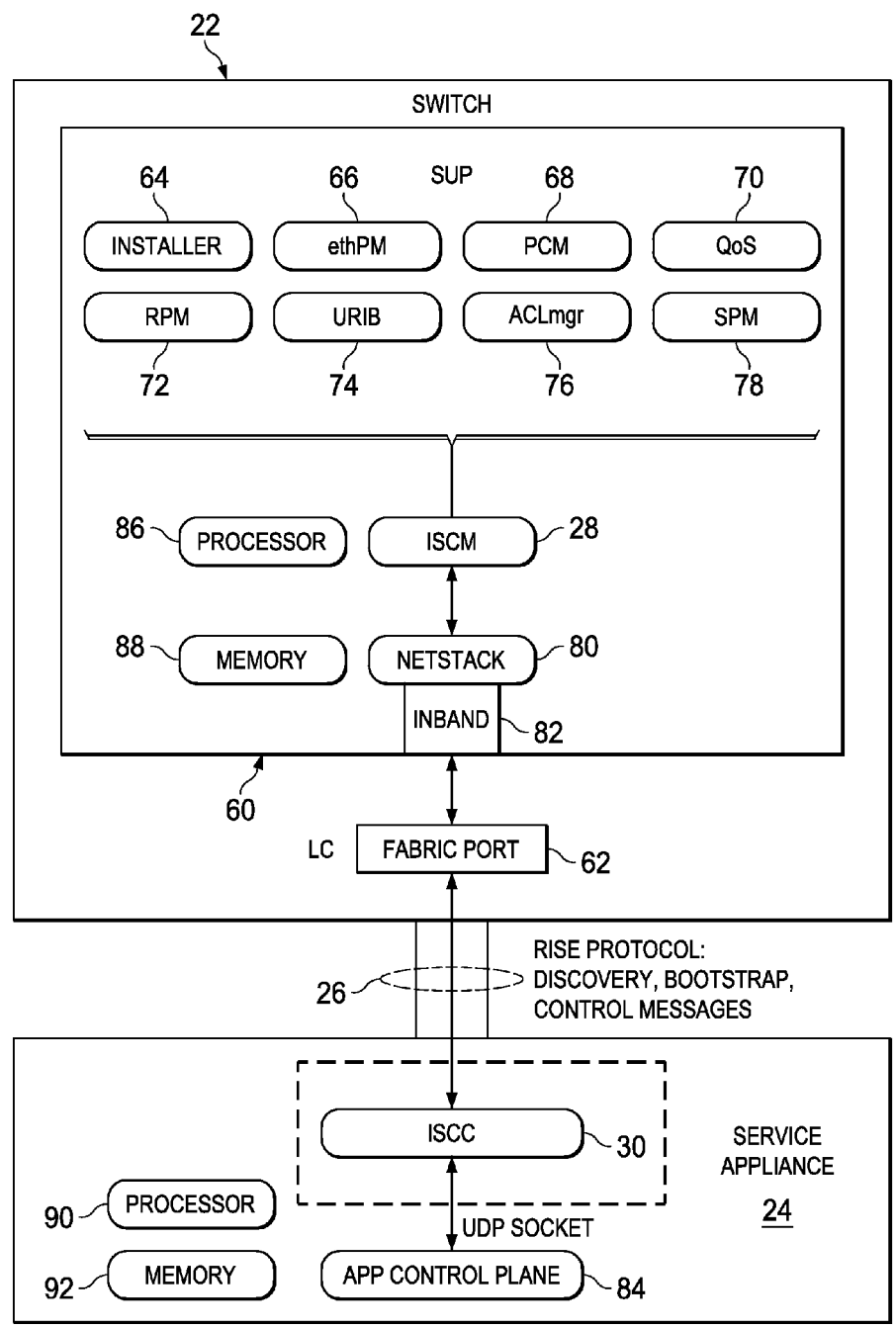
FIG. 2 is a simplified block diagram illustrating details of the system in accordance with one embodiment.

FIGS. 1A-B and 2 show examples of a system architecture for provisioning resources to multiple virtual devices. In addition, the system architecture can provide service appliances as virtual line cards in a network switch. Moreover, the system architecture can provide communication mechanisms in the network environment, and specifically, provide communication mechanisms between the service appliances and virtual device contexts on the network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

Turning to FIG. 1A, FIG. 1A is a simplified schematic diagram illustrating a physical view of a system 10 for providing service appliances in a network environment. FIG. 1A includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within the same farm via switches 20a and 20b, respectively. Servers in server farm 14a may communicate with servers in server farm 14b via a switch 22 in this particular example implementation. The server farms are exemplary resources, which may be accessed by service appliance 24 via switch 22.

A service appliance 24 may connect to switch 22 over a communication channel 26 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and generally separate) hardware device with integrated software (e.g., firmware), designed to provide one or more network services including loadbalancing, firewall, intrusion prevention, virtual private network (VPN), proxy, etc. In some cases, switch 22 may be configured with an intelligent service card manager module (ISCM) 28, and service appliance 24 may be configured with a corresponding intelligent service card client module (ISCC) 30. ISCM 28 and ISCC 30 can form part of a Remote Integrated Service Engine (RISE) infrastructure for configuring service appliance 24 on the switch, e.g., as a virtual line card in switch 22. In some cases, the service appliance is physically separate from the switch, although a communication channel (e.g., between the ISCM 28 (on the switch) and ISCC 30 (on the service appliance)) couples the service appliance and the switch. In such a case, the ISCM 28 (on the switch) and ISCC 30 (on the service appliance) enable provisioning the service appliance as a virtual line card in the switch and for enabling various communication mechanisms and recovery mechanism as disclosed herein.

Service appliance 24 may include a plurality of appliance ports, and switch may include a plurality of switch ports. The appliance ports and the switch ports may be connected in any suitable manner to form communication channel 26. In certain instances, the switch ports may be line card ports of the same type (e.g., Ethernet) as the appliance ports.

Turning to FIG. 1B, FIG. 1B is a simplified schematic diagram illustrating a logical view of system 10. In some cases, ISCC 30 and ISCM 28 may be configured to allow service appliance 24 to appear as a virtual line card 25, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 25 is interchangeable (in certain instances) with ISCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch (e.g., on an appropriate slot) while the service appliance is physically separate from (and external to) the switch. Virtual service modules are similarly configurable within a switch.

Broadly speaking, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 10. For example, setting up service appliance 24 for network configurations may be unnecessary. Substantially all such configurations may be made via switch 22, instead of service appliance 24. Service appliance 24 may offload (i.e., transfer) any network (e.g., L2/L3 network) specific control plane and data plane operations to switch 22. Data path acceleration that leverages an application specific integrated circuit (ASIC) (potentially embedded in switch 22) may also be possible in various embodiments. Switch 22 may communicate control messages to service appliance 24 over communication channel 26. Thus, configuration and provisioning of services within service appliance 24 may be implemented via switch 22.

Note that the numerical and letter designations assigned to the elements of FIGS. 1A and 1B do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 1B. Any number of server farms and switches may be connected in the network without departing from the broad scope of the present disclosure.

For purposes of illustrating the techniques of system 10, it is important to understand the communications in a given system such as the system shown in FIGS. 1A and 1B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services (also references as "services") such as loadbalancing, firewall, intrusion prevention, proxy, virtual private network (VPN), etc. are provided through one or more of the following options: (1) service appliances that connect to network switches and/or routers; (2) specially designed high-performance routers configured with the services; or (3) network devices such as routers or switches that are configured with service modules that provide the services.

Typical service appliances (e.g., loadbalancers) integrate services such as loadbalancing, firewall, intrusion prevention, VPN, etc. in a single box format, which is generally based on modular, scalable platforms and which provides the most cost-effective option of the three options listed previously. Service appliances are typically connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 1A and 1B, the example network environment may be configured as one or more networks and, further, may be configured in any form including, but not limited to, local area networks (LANs), wireless local area networks (WLANs), virtual local area networks (VLANs), metropolitan area networks (MANS), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20a, and 20b, may include any type of network element connecting network segments. For example, switches 22, 20a, and 20b may include a multi-port network bridge that processes and routes data at a data link layer (Layer 2). In another example, switches 22, 20a, and 20b may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 22, 20a, and 20b may be integrated into other network devices such as gateways, routers, or servers. In various embodiments, switches 22, 20a, and 20b may be managed switches (e.g., managed using a command line interface (CLI), a web interface, etc.).

Communication channel 26 may include a port-channel, which can encompass an aggregation of multiple physical interfaces into one logical interface, for example, to provide higher aggregated bandwidth, loadbalancing, and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel (vPC).

Although FIGS. 1A and 1B show server farms 14a and 14b, it should be appreciated that system 10 is not limited to servers. In fact, any network element may be connected to the network via appropriate switches, where these implementations may be based on particular needs. Any network element may be a shared resource that is provided to multiple virtual devices. As used herein, the term "network element" is meant to encompass computers, network appliances, servers, routers, switches, gateways, bridges, loadbalancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. In still another example, server farms 14a and 14b may be replaced with one or more storage devices. Various other configurations and devices are contemplated within the broad framework of the present disclosure.

According to embodiments of the present disclosure, system 10 may provide for a fabric extender (FEX)-like protocol, auto-discovery, control messages in message transport service (MTS) format, control messages in a format that extends the MTS, and defined messages between service appliance 24 and switch 22. Configuration of service appliance 24 may be performed on switch 22 as for a line card.

Data path forwarding may be offloaded to network line cards in switch 22. Control path processing may be offloaded to a supervisor engine on switch 22 as appropriate. In embodiments where service appliance 24 has multiple virtual services (e.g., virtual machines), each virtual service may be a separate virtual line card on switch 22.

Turning to FIG. 2, FIG. 2 is a simplified block diagram illustrating example details of system 10 according to embodiments of the present disclosure. A supervisor engine 60 on switch 22 may communicate service appliance 24 via a line card including a fabric port 62 that connects point-to-point to a node on service appliance 24. Supervisor engine 60 may include several modules such as an installer 64, an Ethernet port manager (ethPM) 66, a port-channel manager (PCM) 68, a Quality of Service (QoS) element 70, a route policy manager (RPM) 72, a unified/unicast routing information base (URIB) 74, an access control list manager (ACLmgr) 76, and a service policy manager (SPM) 78 for performing various routing and/or management functions. ISCM 28 may be provisioned in supervisor engine 60 to provide RISE related functionalities. ISCM 28 may manage one or more service modules, including in-chassis service modules and remote service modules.

In various embodiments, service appliance 24 may support stream control transmission protocol (SCTP) with various addresses (e.g., 127 addresses). In the absence of native SCTP support in supervisor engine 60, tunneling over UDP may be enforced to send SCTP packets. A Netstack module 80 may be provisioned in supervisor engine 60 for implementing TCP/IP stack for received frames hitting the control-plane of supervisor engine 60. Supervisor engine 60 may be configured with an inband port 82, which may be a virtual port that provides an interface for management traffic (such as auto-discovery) to a management processor such as a processor 86.

According to various embodiments, ISCM 28 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. A RISE message may comprise an opcode and a payload content. ISCM 28 may be a finite state machine utility (FSMU) based application (e.g., which indicates an abstract machine that can be in one of a finite number of states). In various embodiments, ISCM 28 may have a well-defined MTS seamless authentication protocol (MTS SAP) assigned and it can open a socket-based MTS queue and bind to the well-defined SAP such that other processes may communicate with it.

In various embodiments, ISCM 28 may also maintain an array of MTS operation code ("opcode"), which can define how to process a received MTS message. The array may include per-opcode specific MTS flags, handler functions, etc. ISCM 28 may be configured to receive CLI driven MTS messages, MTS notifications (such as event driven messages indicating, for example, that a particular VLAN is up or down), and MTS request/responses. In various embodiments, ISCM 28 may be configured so that MTS-based communication with other processes may be non-blocking and asynchronous. Thus, ISCM 28 may handle multiple events (which can arrive at any time) for the same resource such that the state of the resource is consistent (and not compromised). A similar opcode can be provided even in non-MTS messages, which serves to indicate how a switch or a service can process the message.

Subsequent to ports (e.g., appliance ports 40 and switch ports 42) being configured in RISE mode, ISCM 28 and ISCC 30 may perform auto-discovery and bootstrap to establish an appropriate control channel. After the control channel is established, applications in service appliance 24 may send control messages (e.g., using the UDP socket interface) to ISCC 30 through an application control plane 84. Application control plane 84 generally encompasses one or more software components for performing workflow management, self-management, and other application control layer processes. ISCC 30 may forward the control messages to ISCM 28 of switch 22 over communication channel 26. In example embodiments, ISCM 28 and ISCC 30 may communicate via UDP packets; however, various other protocols and formats may be accommodated by the teachings of the present disclosure. Supervisor 60 may be provisioned with (or have access to) processor 86 and a memory 88 for performing its various functions. ISCM 28 may use processor 86 and memory 88 to perform RISE related functions in switch 22. Similarly, service appliance 24 may be provisioned with (or have access to) a processor 90 and a memory 92. ISCC 30 may use processor 90 and memory 92 to perform RISE related functions in service appliance 24.

In some embodiments, a message (e.g., a RISE message) comprises an opcode and a corresponding payload content. The ISCM does the switching of messages between channels based on their opcode and incoming channel (and the services to which the messages correspond). Typically, what is received over the application channel is sent to service channel and vice-versa. Some messages are terminated in (e.g., consumed by) the agent itself and not forwarded or switched. The health monitoring message sequence via discovery channel can be terminated on ISCC itself.

Broadly speaking, the agent on an appliance can handle communications between the service appliance and many switches (many services), and perhaps more importantly, the agent can handle routing of the communications between appropriate channels for the particular service.

It is up to the vendor appliance whether to encrypt the channels between the agent and the application. However, the agent can enforce encryption on any one or more of the channels between the agent and the switch. Advantageously, the encryption is transparent to the application itself, and ensures security of packets on the channels between the agent and the switch from packet sniffing.

Figure 3:
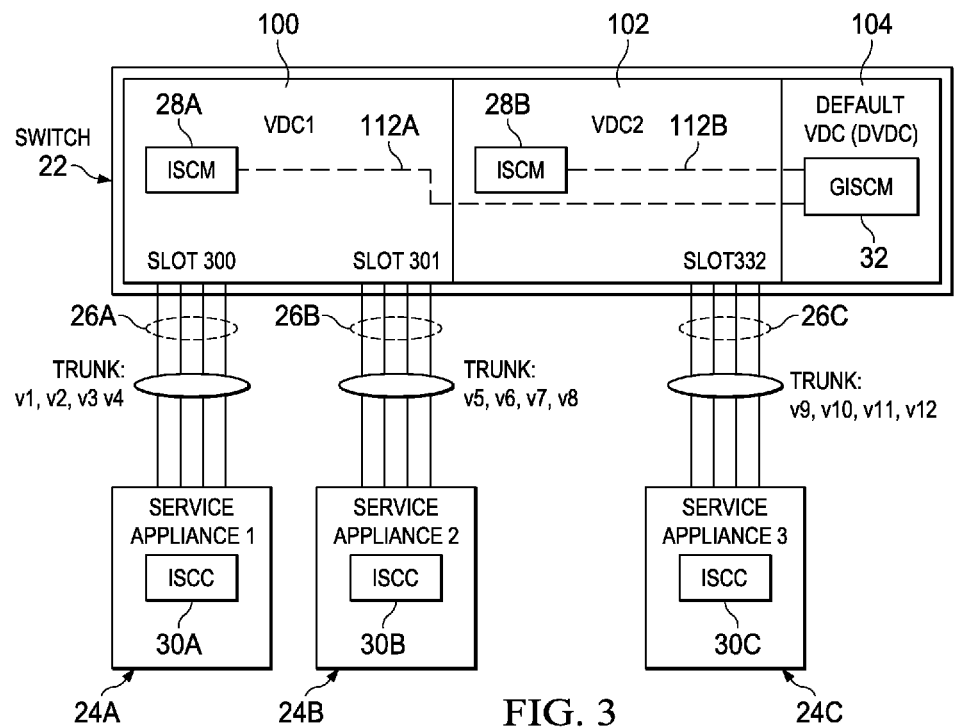
FIG. 3 is a simplified block diagram illustrating another embodiment of the system.

Turning to FIG. 3, FIG. 3 is a simplified block diagram illustrating additional details of system 10. According to one embodiment, switch 22 may be configured as one or more virtual device contents (VDCs). VDCs allow switch 22 to be virtualized at the device level, including as multiple virtualized (logical) devices. In this example, the switch 22 has been configured (e.g., by applying settings or inputting CLI commands) as three VDCs, i.e., VDC 100, VDC 102, and default VDC (DVDC) 104. The Each VDC presents itself as a unique device to connected users within the framework of switch 22. Each VDC runs as a separate logical entity within switch 22, maintaining its own unique set of running software processes. Each VDC can have assigned to it physical ports, a separate management domain (e.g., supervisor engine), different processors, different memory elements, or any other resource available to the switch. Each VDC on switch 22 may be configured with a separate ISCM. In addition, each VDC may have a unique VDC ID and/or a VDC name, which may be utilized to identify the VDC.

Service appliances 24a, 24b, and 24c may be connected to switch 22. Switch 22 comprises three: VDCs, 100 and 102, provisioned with ISCM 28a and ISCM 28b, respectively, and DVDC 104, provisioned with global ISCM (GISCM) 32. ISCM 28a communicates with (and/or manages) ISCC 30a of service appliance 24a (via service slot 300) and communicates with (and/or manages) ISCC 30b of service appliance 24b (via service slot 301). ISCM 28b communicates with (and/or manages) ISCC 30c of service appliance 24c. Each of ISCMs 28a and 28b has at least two communication channels: communication channels coupled to the ISCMs (e.g., communication channels 26a-c) and communication channels coupled to the GISCM 32 (communication channels 112a and 112b). The DVDC may communicate with the service applications 24a-b by way of receiving such communications via the communication channels 112a and 112b between the GISCM 32 and the ISCMs 28a and 28b. The GISCM 32 is described in further detail below. Various other configurations of service appliances and VDCs are possible within the broad framework of the present disclosure. For example, each ISCC may communicate with ISCMs in separate VDCs. In another example, all three ISCCs may communicate with an ISCM in a single VDC.

In one embodiment, ISCCs 30a-c and ISCM 28a-b may communicate using a VLAN Trunking Protocol (VTP) over communication channels 26a-c, respectively. In other embodiments, comparable protocols such as IEEE Generic VLAN Registration Protocol (GVRP), or IEEE Multiple VLAN Registration Protocol (MVRP) may be used over communication channels 26a-c for communication. The user may allocate switch ports of switch 22 for the respective service appliances 24a-c and configure them, for example, as port-channels in trunk switch mode (associating a list of VLANs). The trunk allowed VLANs on each communication channel 26a-c may include the VLANs in the VLAN group, as well as RISE-VLAN (e.g., a service appliance configured as RISE to appear as virtual line cards).

The trunk ports may be, by default, members of the VLANs that exist on switch 22, and can carry traffic for those VLANs between switch 22 and service appliances 24a-c. To distinguish between the traffic flows from various service appliances, the trunk ports may mark the frames with special tags as they pass between switch 22 and respective service appliances 24a-c. The trunk ports may be configured to specify the VLAN groups associated with the respective trunk ports. For example, communication channel 26a may be configured to associate VLANs v1, v2, v3, and v4; communication channel 26b may be configured to associate VLANs v5, v6, v7, and v8; and communication channel 26c may be configured to associate VLANs v9, v10, v11, and v12.

Supervisor software (e.g., a supervisor engine) can provide the VDC ID, VDC name, and service slot number from the VDC to the service appliance. Turning again to FIG. 3, an ISCM (e.g., any of ISCMs 28a-b, or any similar software process running on a supervisor process of the switch) can support multiple services from a service appliance (e.g., service appliances 24a-b) by providing this information (i.e., the VDC ID, VDC name, and/or service slot number) to each service via a communication channel (e.g., channels 26a-c) established by ISCM. For example, the VDC ID (and/or VDC name) is included in a payload of a discovery message or in a payload of a bootstrap message. Thus, upon initiating a service appliance, the service appliance may receive the VDC ID (and/or VDC name) to which it is connected. When a new service is created on the switch (e.g., by the service appliance), it is assigned a first available slot number from a range of reserved service slot numbers on the VDC (e.g., the lowest available service slot number from the range).

The VDC may utilize the ISCM to transmit the service slot number to the service appliance (e.g., via the ISCC). The service (on a service appliance) may be identified using a combination of the service slot number and VDC ID. Each service appliance may maintain a database including the VDC ID, the VDC name, and a service slot number corresponding to each of its services. Each ISCM can retrieve and store a reference to the VDC that the service is associated with and provide the information to the service. Since the service is created on a VDC (e.g., by applying CLI commands to the VDC), an API is used (e.g., by the service) to retrieve and store a reference to the VDC when the service is created.

The service slot identifier (numbering) scheme is divided on a per VDC basis to have a globally unique slot number range, e.g., 300-331 in VDC1, 332-363 in VDC2, as is illustrated in FIG. 3. As can be see in FIG. 3, although only two slots are occupied on VDC 100 (i.e., service slot numbers 300 and 301), the service slot numbers for VDC 102 begin at 332 (and do not include 300-331), thereby maintaining the service slots numbered 302-331 reserved for VDC 100 to provide a range of unique service slot numbers for each VDC. In one example, a resource manager process is executed to identify available slots in a switch and/or to assign different subsets of the available service slots to corresponding VDCs (e.g., to create the unique slot ranges).

Figure 4:
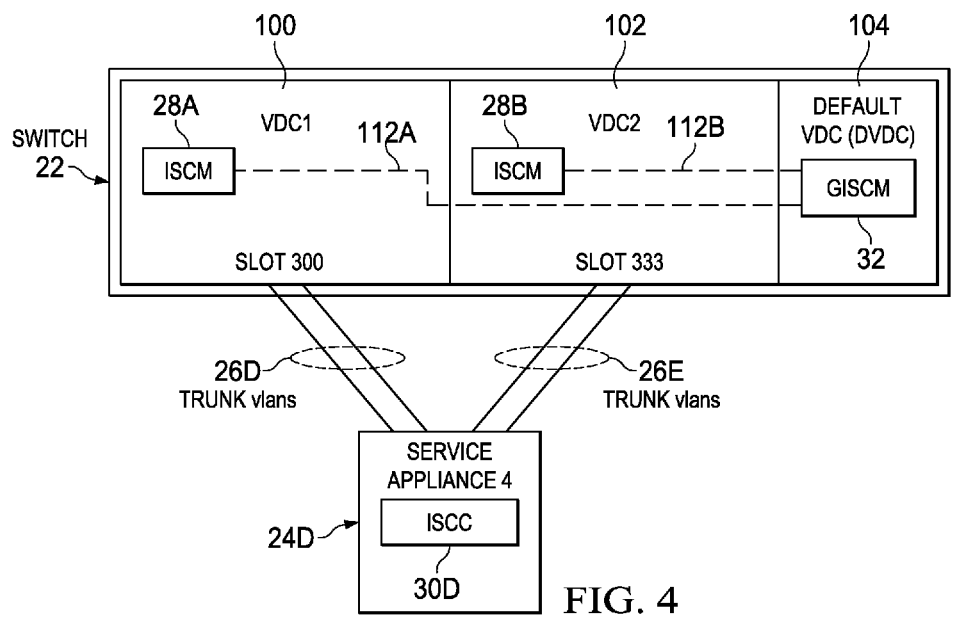
FIG. 4 is a simplified block diagram showing additional details of the system.

Turning to FIG. 4, FIG. 4 is a simplified block diagram showing additional details of system 10. Service appliance 24s may establish RISE communication channels to multiple VDCs 100 and 102. Only two VDCs are illustrated in FIG. 4; however, any number of VDCs may communicate with service appliance 24 without departing from the broad scope of the present disclosure. Each of VDCs 100 and 102 may be a virtual context within a single physical switch (e.g., switch 22). VDC1 100 may be provisioned with ISCM 28a and VDC2 102 may be provisioned with ISCM 28b. ISCC 30 is provisioned in service appliance 24d. Each ISCM 28a-d may pass respective VDC identifications (e.g., VDC ID such as VDC1, VDC2, etc.) so that ISCC 30 knows where to send the return messages.

Switch 22 (e.g., as illustrated in each of FIGS. 1, 2, 3, 4, and 5B) includes a global ISCM (GISCM) 32 located in the DVDC 104. The GISCM forms part of the Remote Integrated Service Engine (RISE) element with the one or more ISCMs. The DVDC can utilize the GISCM to access an ISCM in each of the VDCs that reside on a same switch as the DVDC and, thereby, can exchange data with one or more of the VDCs on the same switch (e.g., individual VDCs or all VDCs). The GISCM 32 and the ISCMs 28a and 28b exchange data over communication channels 112a and 112b. For example, the DVDC can utilize the GISCM to generate an overview of one or more (e.g., individual VDCs or all VDCs) of the VDCs on the same switch (e.g., by polling each of VDC 100 and 102 for operational status). In addition, the DVDC can utilize the GISCM to provide the VDCs with access to data that is stored at the DVDC (e.g., by transmitting a reference to the data to VDCs 28a and 28b over the communication channels 112a and 112b respectively). In some implementations, the GISCM is to, among other things, provide access to a status of RISE services in all VDC local instances (i.e., local to a switch). The global ISCM (GISCM) may comprise hardware and/or software for communicating with (transmitting messages to and receiving messages from) the ISCM each of a plurality of VDCs in a switch. In an embodiment, the GISCM may receive instructions from a CLI and/or graphical user interface, where the instructions, when executed by the GISCM, cause the GISCM to provide the VDCs with access to data that is stored at the DVDC (e.g., where the data is configuration data that identifies a network resource). In other examples, the instructions, when executed by the GISCM, cause the GISCM to generate a view of the status of RISE services in all VDC local instances (e.g., VDC 100 and 102). In further examples, the instructions, when executed by the GISCM, cause the GISCM to transmit, to one or more of the VDCs, a status of the network resource identified in the configuration data.

In general, the GISCM 32 (switch global administrator) and the ISCMs 28a and 28b (VDC local administrator) have different levels of access to switch components. An ISCM receives information regarding a service appliance to which it is attached. The information may include for example: software version, hardware version, product serial number, and/or hardware specifications (e.g., CPU, memory, etc.). In one example, an ISCC on the service appliance may send the information to the ISCM on the VDC when the service appliance is discovered or bootstrapped (e.g., by the VDC). Thus, each ISCM may store this information for each of the service appliances to which it is attached. In contrast to an ISCM, which may access only a single VDC on which it resides (e.g., VDC) and the GISCM, the GISCM may have access to (e.g., send messages to, receive messages from, poll, direct the actions of, or otherwise communicate with) all VDCs on a switch (i.e., the switch on which the GISCM resides) by utilizing the corresponding ISCMs for the VDCs. Because the GISCM 32 can access each of the ISCMs 28 on the switch 22, the GISCM 32 can access all the service appliances 24 (and/or data associated therewith) attached to the switch by polling each ISCM (e.g., to retrieve information associated with each service appliance). In an embodiment, the information retrieved may include one or more of: software version, hardware version, product serial number, and/or hardware specifications (e.g., CPU, memory, etc.). The GISCM can aggregate (e.g., collate) the information (e.g., for generating a graphical representation of the data for presentation to a user).

The GISCM (e.g., GISCM 32) provides features such as polling the individual ISCMs and/or aggregating data from one or more ISCM to provide a global view of a switch (e.g., at one or more levels of abstraction). Using such features, a service appliance (and/or service) can, e.g., retrieve information about VDC resources and capabilities. In one example, the GISCM transmits a command (e.g., a "show-Module" command) to an ISCM to poll data from the ISCM. Such a command may be transmitted to each of a plurality of ISCMs on a switch. When each ISCM receives the command, it may generate and transmit, to the GISCM, a response comprising any one or more of: software version, hardware version, product serial number, and/or hardware specifications. Finally, the GISCM may aggregate the responses (and/or data therein) from each ISCM to provide a global view of a switch. In operation, such a process of polling and/or aggregating may be utilized for trouble shooting a switch and/or any logical or physical components coupled thereto. For example, the process may be used to determine which software version a service appliance is running. The version may be compared to an expected software version (e.g., based on other service appliances coupled to a service or VDC) to determine whether the versions match or are mismatched. In other cases, the software version may be compared to a list of supported (and/or unsupported) software versions to verify compatibility (or non-compatibility). In other examples, the process may be utilized to determine hardware specifications of a service appliance. For example, the amount of available memory in a service appliance may be compared to an amount of required memory for a service to determine whether the service appliance can support the service. This information may be used to troubleshoot the service appliance when errors are detected. The service appliance may utilize the GISCM to determine, e.g., whether it is running out of memory and/or whether a VDC to which it is connected is running out of memory. Advantageously, this global view allows a service appliance (and/or service) to make intelligent load balancing decisions based on VDC information. In other examples, the service appliance may also determine which of a plurality of VDCs with which to connect (e.g., selecting a VDC that has available CPU capacity for handling an estimated amount of traffic to be sent over the connection).

In a broad sense, the GISCM can access each of multiple levels of abstraction of the switch. For example, the switch may have several levels of abstraction including a VDC level (1): a switch may comprise one or more VDCs, a service appliance level (2): each VDC may be connected to one or more service appliances, and a service level (3): each service appliance may support one or more services. The levels may be arranged in a hierarchy to match the relationship (physical and/or logical relationship/connections) between VDCs, service appliances, and services. The GISCM may traverse the hierarchy of the levels to reach a specific level. For example, the GISCM may use the ISCM to access level a VDC at (1). After reaching level (1), the GISCM may utilize the VDC to access a service appliance at level (2). After reaching level (2), the GISCM may utilize the service appliance to access a service at level (3). In this example, the GISCM traverses down the hierarchy (i.e., from a broad level (i.e., level 1) to a more specific level (i.e., level 3). The GISCM is not limited to such a traversal. The GISCM may traverse up the hierarchy and/or may alternate between moving up and down at various levels of the hierarchy. Because the levels are hierarchically organized, the GISCM is able to: correlate VDCs to service appliances and/or services, or correlate service appliances to VDCs and/or services and to aggregate data based on the correlations. The GISCM on the switch may transmit the correlations or data associated therewith (e.g., unprocessed data, aggregated data, etc.) to any one or more of: a VDC on the switch, a service appliance coupled to the switch, and/or a service supported by the switch.

A GISCM offers many advantages over a traditional system. Using a GISCM, a service appliance advantageously gains visibility into Virtual Device Contexts (VDCs) to which they are connected. In addition, the service appliances may utilize the GISCM to determine the type of traffic that the VDCs are servicing. This may require aggregating data for a plurality of service appliances that are connected to the VDC to which a particular service appliance is connected. In traditional systems, a service appliance may only know about its own connection to a VDC and therefore fails to allow such global aggregation and provision to a particular service appliance. Such features allow a service appliance to specify a policy (or VDC configuration) that is enforced (at least in part, by using the GISCM) on the VDCs to which they are connected. Traditional systems fail to support such features at least because they lack a GISCM as disclosed herein, e.g., to provide a global view.

Figure 5A:
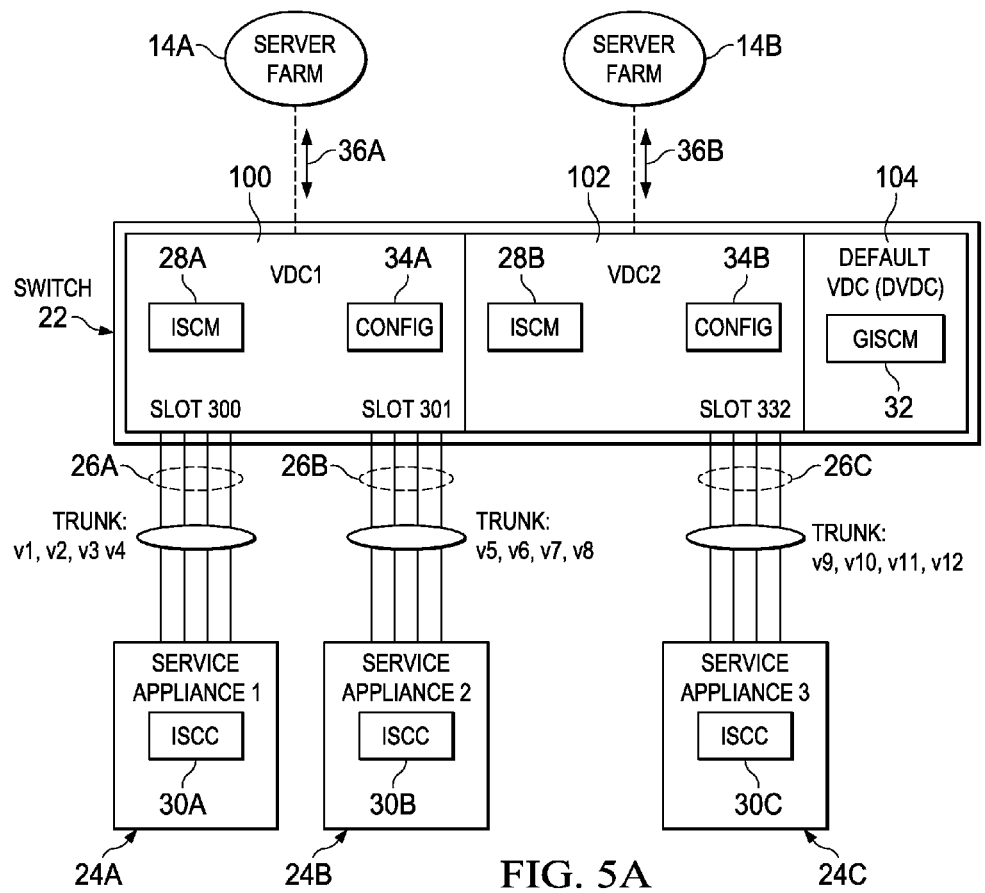
FIGS. 5A and 5B are simplified block diagrams showing additional details of the system.
Figure 5B:
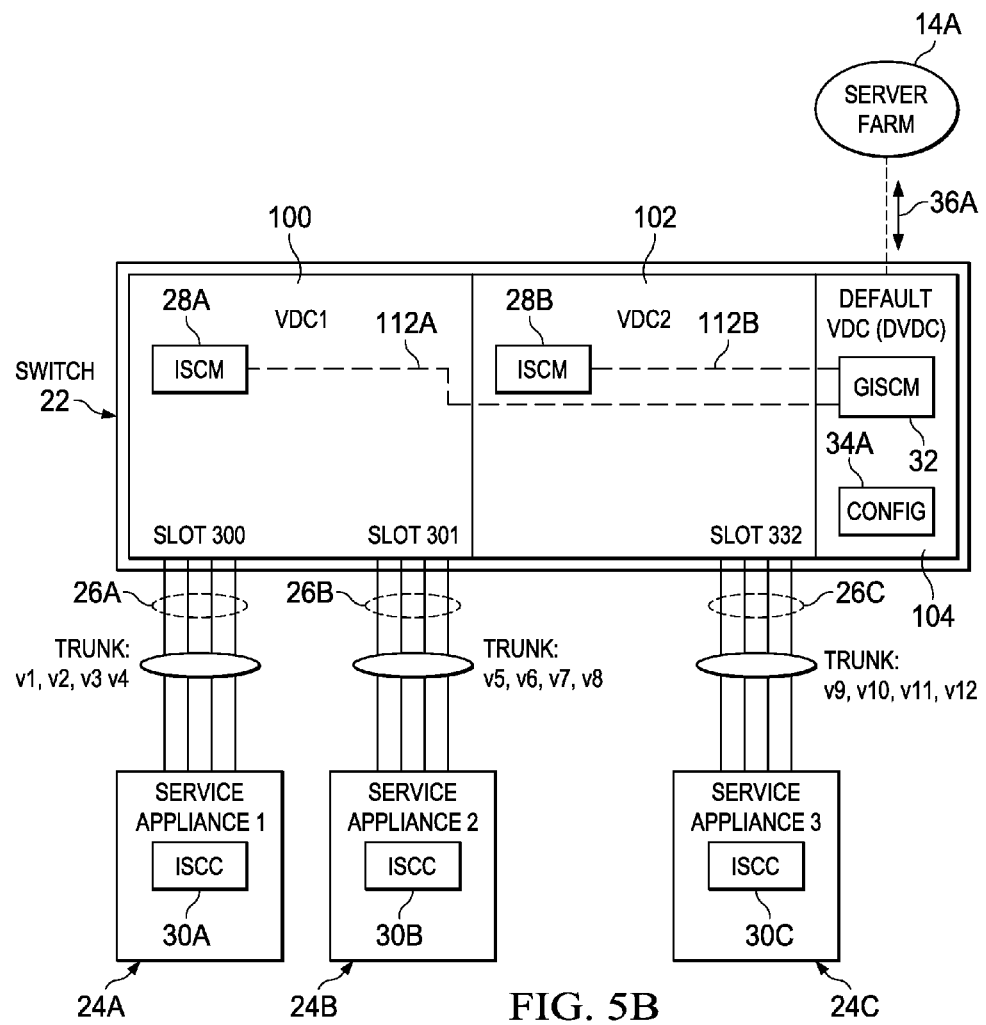

FIGS. 5A and 5B are simplified block diagrams showing additional details of the system for providing shared (and/or global) resources. The components of switch 22 in FIGS. 5A and 5B are similar to those as described with respect to FIGS. 3 and 4 and are not repeated here only for the purpose of brevity.

Turning to FIG. 5A, FIG. 5A illustrates that each of VDC1 (100) and VDC2 (102) appears, from the perspective of each of the VDCs 100 and 102, to have access to a separate resource (i.e., server farms 14*a* and 14*b*). However, each of VDC1 (100) and VDC2 (102) is provided with a separate instance of configuration data for a server farm (i.e., the server farm is a shared resource). Although each VDC has a separate instance of the configuration data for a server farm, the access information relates to the same set of physical devices (i.e., the server farm 14*a* and the server farm 14*b* are physically and logically the same group of devices). The VDCs are not aware that they are sharing the same group of devices. Server farm 14*a* is operably coupled to VDC1. Server farm 14*b* is operably coupled to VDC2. However, because the server farm 14*a* and the server farm 14*b* are physically and logically the same group of devices, the VDCs 100 and 102 are sharing the same resource (i.e., a shared resource).

Both VDC1 (100) and VDC2 (102) store configuration data 34*a* and 34*b*, respectively. Each of configuration data 34*a* and 34*b* identifies a network resource (i.e., the server farm). Because the server farms 14*a* and 14*b* are a single resource (though they appear to be separate from the perspective of VDCs 100 and 102), the configuration files 34*a* and 34*b* may be identical to one another (or substantially identical to one another). For example, the configuration files 34*a* and 34*b* may each include the same set of network addresses that define the resource. The configuration files 34*a* and 34*b* are separate and independent from one another (event though they relate to a single, shared resource). As a result, any changes to the access information for the shared resource requires that such changes be made in each of the plurality of VDCs. In other words, to maintain a consistent view of the shared resource across all of the VDCs on switch 22, any changes to the shared resource, requires separate updates to each of configuration files 34*a* and 34*b*. In some cases, the GISCM 32 may update each of the configuration files 34*a* and 34*b* such that they reflect any changes. Such operations may be redundant since each of the configuration files 34*a* and 34*b* are identical (or substantially similar) to one another.

Each of the VDCs may implement a probe to monitor the health of any node in the server farm to which it is connected. For example, VDC1 may implement a probe 36*a* to monitor the health status of any node on the server farm 14*a*. VDC2 and VDC1 are independent of one another. Thus, VDC2 (102) may separately implement a different probe 36*b* to monitor the health status of server farm 14*b*. Because VDC2 and VDC1 are both located on the same switch 22, each may utilize computational resources of the switch (e.g., CPU cycles, storage and other resources) to manage their respective instances of a server farm. In this example, because the server farms 14*a* and 14*b* are a single resource (though they appear to be separate from the perspective of VDCs 100 and 102), the probes used to monitor the server farms may identify the same health status information (i.e., because they are monitoring the same resource).

In one example, a service provider utilizes the switch 22 to provide network services to multiple customers (or tenants who "rent" access to resources). The switch 22 (e.g., using the default VDC 104) may create VDC1 (100) for a first customer and to create VDC2 (102) for a second customer. Traffic associated with the first customer is received at and/or transmitted from VDC1. Traffic associated with the second customer is received at and/or transmitted from VDC2.

The service provider may wish to provide a security service to one or more of the customers (e.g., in this case, only the first customer, only the second customer, or both the first and the second customer). In a particular example, the service provider may seek to transmit the traffic for both customers through a set of firewalls for application of one or more security policies. In this particular example, the shared resource may include a set of network addresses that identifies firewalls through which the traffic must be transmitted before further transmission through the network.

In the example, of FIG. 5A, the VDCs may not able to share a resource that is managed by another VDC (e.g., VDC1 cannot directly access the instance of server farm 14b and VDC1 cannot directly access the instance of server farm 14a). Consequently, the service provider must configure separate instances of server farms (which includes firewalls to provide the security service) in each of the VDCs. Although the service provider may apply the same security policies to each of VDC1 and VDC2, the server farms 34a and 34b are individually configured and associated with VDC1 and VDC2 respectively (since the resource, in this case the instances of server farms, cannot be directly shared). Moreover, because the instances of server farms 14a and 14b relate to the same single resource, the configuration data 34a may be substantially similar to the configuration data 34b. Thus, the configuration data may be redundantly stored in more than one of the VDCs on the switch 22.

Separately configuring such resources on each VDC on a switch presents several challenges. The switch 22 has a limited amount of computational power (e.g., CPU capacity). Managing separate instances of resources on the switch may quickly consume a portion of the computational power. In addition, the switch 22 may have a limit on a total number of resources (e.g., device groups, server farms, or other resources) that it can support. Consequently, each VDC having an individual instance of a particular resource may limit the resources that each VDC can receive. Moreover, the independent nature of each of the instances of the resource (e.g., server farms 14a-b) requires that any changes that are common to the resource must be made each individual server resources (e.g., by updating configuration data 34a and 34b). For example, if a service provider adds a new security policy to protect the network from a recently discovered virus, the service provider would need to update the server farms associated with each VDC on switch 22 by updating the configuration data in each VDC (i.e., both 34a and 34b would require an update).

Turning to FIG. 5B, FIG. 5B illustrates that default VDC (DVDC) 104 is provided with a instance of a server farm, which can be shared with each of VDC1 (100) and VDC2 (102). A difference between the example in FIG. 5A and the example of FIG. 5B is that, in FIG. 5A each VDC (i.e., each of VDCs 100 and 102) separately stores configuration data, while in FIG. 5B, only the DVDC 104 stores the configuration data 34a. In FIG. 5B, all other VDCs (i.e., VDCs 100 and 102) reference the configuration data 34a stored in the DVDC 104 (i.e., VDCs 100 and 102 do not store a copy of the configuration data). In addition, in the example of FIG. 5B, only the DVDC 104 implements a probe 36a to monitor the health status of any node on the server farm 14a.

The configuration data 34a identifies a network resource. In the example of FIG. 5B, the server farm 14a is the network resource. In one example, the GISCM 32 stores, in the configuration data 34a, a network address of each node in the server farm 14a. It is noted that each of VDCs 100 and 102 may still store some configuration information. However, such configuration information may include a reference to the configuration data 34a (which is stored in DVDC 104) and may not redundantly store all of the data that is included in configuration data 34a. The DVDC transmits such a reference to the configuration data 34a to VDCs 100 and 102 located on the switch 22. In such an example, each of VDCs 100 and 102 stores the reference and does not store the configuration data 34a. The VDCs 100 and 102 may utilize the reference to request to access the configuration data (e.g., by activating a hyperlink corresponding to the reference). The DVDC may transmit, to one or more of the VDCs 100 and 102, at least a portion of the configuration data 34a (e.g., based on the request, and/or when it is detected that the hyperlink is activated). The at least the portion of the configuration data 34a is operable to initiate a connection between the one or more of the VDCs 100 and 102 and the server farm 14a. As an example, each of the VDCs 100 and 102 can initiate, using the at least the portion of the configuration data 34a, a communication channel over which messages may be sent to the server farm 14a and/or messages may be received from the server farm 14a. As a further example, each VDC may retrieve IP addresses from the configuration data 34a and establish a network connection to each of the IP addresses. In some examples, the reference stored by each of VDCs 100 and 102 may comprise a pointer to a memory address in which the configuration data 34a is stored. The memory address may be an address that is located in a memory element associated with the DVDC 104 (e.g., a memory address local to the DVDC 104 and/or under the administrative domain of the DVDC 104 and not under the administrative domain of either of VDCs 100 and 102). Alternatively, the reference stored by each of VDCs 100 and 102 may be an identifier that identifies the configuration data 34a (e.g., where the identifier may be used to access the configuration data 34a from a database). Further, the reference stored by each of VDCs 100 and 102 may be a hyperlink that, when activated by a VDC, causes the VDC to request access to data at a memory address identified in the hyperlink. Accessing the data, by the VDC, may include retrieving the data (from the memory address) and utilizing the data to initiate a connection to the network resource. Any approach for storing a reference (or link) to the configuration data 34a of the DVDC may be used.

In additional, the configuration data 34a may include information required to instantiate and/or communicate with a resource (e.g., access information, policies, routing information, network addresses, communication protocols, and the like). In a particular example, the configuration data 34a comprises IP addresses for of each of a plurality of devices (either virtual and/or physical) that define the resource and/or a identifier for the group of devices (e.g., the identifier may be used as a reference to retrieve the IP addresses from a database or other memory element). The configuration data may also include parameters required to establish the network connection. For example, the VDC may retrieve an identifier that identifies a protocol to be utilized for the network connection to the IP addresses (e.g., ICMP, TCP, UDP, IP, or any other protocol that enable communication over a network). As a further example, the network connection may be generated as a TCP/IP connection to each of the IP addresses. In other examples, the network connection may be generated as a TCP/IP connection to a subset of the IP addresses and the network connection may be generated as a UDP connection to the remaining IP addresses (i.e., those addresses not in the subset). In the example of FIG. 5B, messages may be (bidirectionally) passed between the server farm 14a and DVDC 104 (100) over the probe 36a. However, each of VDC 100 and VDC 102, may separately initiate (and utilize) a network connection to server farm 14a.

In the example of FIG. 5B, when network services are provisioned for the first customer (VDC1) the second customer (VDC2), the corresponding VDCs may store a reference to the server farm 14a (e.g., both refer to the same server farm 14a and therefore share the resource). The GISCM may store an association between the server farm 14a and each of the first customer (and/or VDC1) and the second customer (and/or VDC2) who are authorized to access or utilize the server farm 14a (i.e., subscribers to or tenant of the server farm 14a). When the GISCM 32 receives health status monitoring data from the server farm 14a (e.g., via probe 36a), the GISCM may transmit such monitoring data (or portion thereof) to the ISCM 28a and/or ISCM 28b.

Since the server farm 14a is provisioned in the DVDC 104 (e.g., using configuration data 34a), the GISCM 32 can access and monitor each node in the server farm using a probe. In contrast to FIG. 5A, where each individual VDC may monitor corresponding server farms, in FIG. 5B, the GISCM 32 performs monitoring of a single server farm 14a (and VDCs 100 and 102 do not directly monitor the server farm 14). In FIG. 5B, the GISCM 32 transmits monitoring data to an ISCM in each of VDC 100 and VDC 102 (i.e., the VDC 100 and VDC 102 receive, from the GISCM 32, the monitoring data for the server farm 14a). The GISCM 32 initiates a probe to a network resource (in this example, the server farm 14a). The probe is inclusive of an active computer network measurement technology or network probe (e.g., IP Service Level Agreements (IP SLAs)) to test or measure a resource and/or network. The probe may utilize a variety of protocols, e.g., to execute commands such as echo, connect, lookups, pings, keepalive, or downloads. For example, the protocols may include any one or more of (but are not limited to) Internet Control Message Protocol (ICMP), Transmission Control Protocol (TCP), User Datagram Protocol (UDP), and/or other protocols operable to test or measure network attributes. The GISCM may utilize the probe to transmit commands to each node identified in the configuration data 34a. The commands may be used to detect in the server farm (e.g., whether each node is properly functioning (dead or alive)). In a particular example, the probes may be utilized to prevent traffic from being sent to a "black hole" in the network. A black hole may be a node (or set of nodes) at which network traffic is dropped without informing the source that the traffic has been dropped. A result of executing such commands may be transmitted to each VDC that is associated with the server farm 14a (e.g., is a subscriber to or tenant of the server farm 14a). In a particular example, a keepalive message is used to verify that the network resource is reachable (e.g., to determine whether a network connection between the DVDC 104 and the resources is operating (or may be used to prevent the connection from being terminated)). In some examples, the DVDC transmits a message (e.g., a keepalive message, any of the above mentioned commands and/or protocols) to the network resource. The message is sent to the network resource to determine whether the network resource is reachable by the DVDC (which may server as proxy for whether the network resource is reachable by the VDCs 102 and 104). When the network resource is operating properly (e.g., with respect to network connectivity), the network resource (e.g., individual nodes in the resource or each node) may generate a response to the message and transmit the response message to the DVDC. The DVDC receives the response message from the network resource. The DVDC determines whether a response message to the message is received within an interval of time. The interval of time is measured relative to a time at which the message was transmitted. In some examples, the interval of time may be an integer in units of seconds. When the DVDC determines that the reply message to the message is received within the interval of time (e.g., in a time interval that is equal to or less than the interval of time), the DVDC generates a status message indicating that a link to the network resource is operational. The DVDC transmits to each of the plurality of VDCs the status message indicating that the link is operational. When the network resource is not operating (or not properly operating) (e.g., with respect to network connectivity), the network resource may not transmit the response message to the DVDC (or may transmit the response message at a time later than the interval of time). When the DVDC determines that the response message to the message is not received within the interval of time, the DVDC generates a status message indicating that the link is not operational the DVDC transmits to each of the plurality of VDCs a second status message indicating that the link is not operational.

Each VDC may not be aware of the other VDCs that share the resource. For example, as traffic arrives on VDC1 (e.g., for first customer), the VDC1 may transmit traffic to the server farm 14a using a first reference to the configuration data 34a stored in the DVDC. Likewise, as traffic arrives on VDC2 (e.g., for second customer), the VDC2 may transmit traffic to the server farm 14a using a second reference (or an instance of the same reference) to the configuration data 34a stored in the DVDC. Because each of VDC1 and VDC2 communicates with the DVDC (via their respective references) to establish a connection to the server farm 14a, neither may be aware of the other's presence. Thus each VDC is able to utilize the resources of a server farm 14a as if it were local to the individual VDCs even though access information for the server farm 14 (and the management of the operational status of the server farm) is centrally located in the default VDC 104. Upon receiving a request to access the server farm from either VDC1 or VDC2 (e.g., when VDC1 or VDC2 activates a hyperlink directed to a memory address storing at least a portion of the configuration data 34a), the DVDC 104 may check health/status of the server farm 14a and/or nodes therein. When it is determined that the server farm is operational, the DVDC 104 may allow the VDC (i.e. the VDC from which the request was received) to access the configuration data and/or may transmit a status of the network resource to the VDC. When it is determined that the network resource is not operational, the DVDC 104 may transmit an error message to the VDC. The error message may identify that the network resource is not operational.

By consolidating the monitoring into the GISCM 32 (in DVDC 104) (as illustrate in FIG. 5B), the number of probes operating on the switch may be reduced from n probes (where 'n' is equal to the number of VDCs provisioned on the switch 22) down to 1 probe (which is the probe utilized by the GISCM 32). In example of FIG. 5A, the computational resources related to probes may increase proportional to number of VDCs. However, in the example of FIG. 5B, the computational resources related to probes may be independent of the number of VDCs in the switch 22 (or may scale up more slowly than those required for FIG. 5A). In addition, the configuration as depicted in FIG. 5B has other advantages including (but not limited to): (1) since the single server farm 14a (instead of multiple server farms) is utilized to provide service to each of VDC1 and VDC2, CPU usage will be reduced (e.g., relative to the configuration shown in FIG. 5A); (2) the server farm 14a has a single point of configuration and management (i.e., configuration data stored only in GISCM 32); (3) any changes to server farm 14a can be made once (i.e., in the global VDC) and need not be replicated for each VDC; (4) Since only GISCM is monitoring nodes in the server farm 14a any node failures affected by the GISCM can be immediately propagated to all VCs (i.e., in contrast to the example of FIG. 5A where each VDC would be to independently detect such failures); and (5) because only the default VDC is running probes on the server farm 14a, computational resources are not duplicated for running separate probes for each VDC.

Figure 6A:
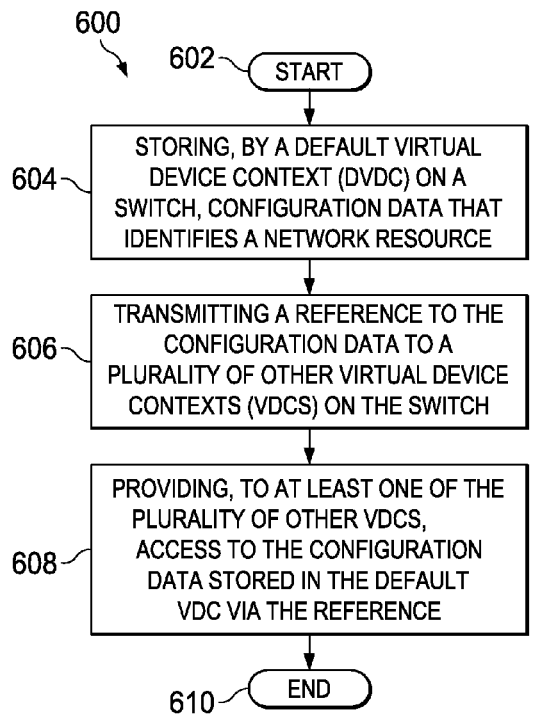
FIGS. 6A, 6B, and 7 illustrate exemplary operations for providing shared resources to virtual devices in accordance with some embodiments of the present disclosure.
Figure 6B:
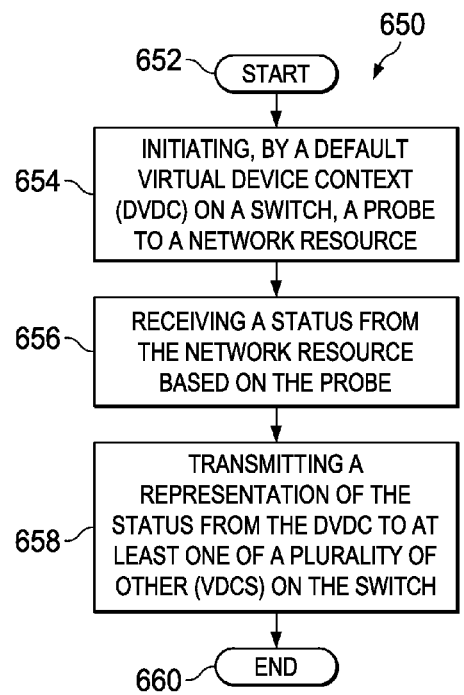
Figure 7:
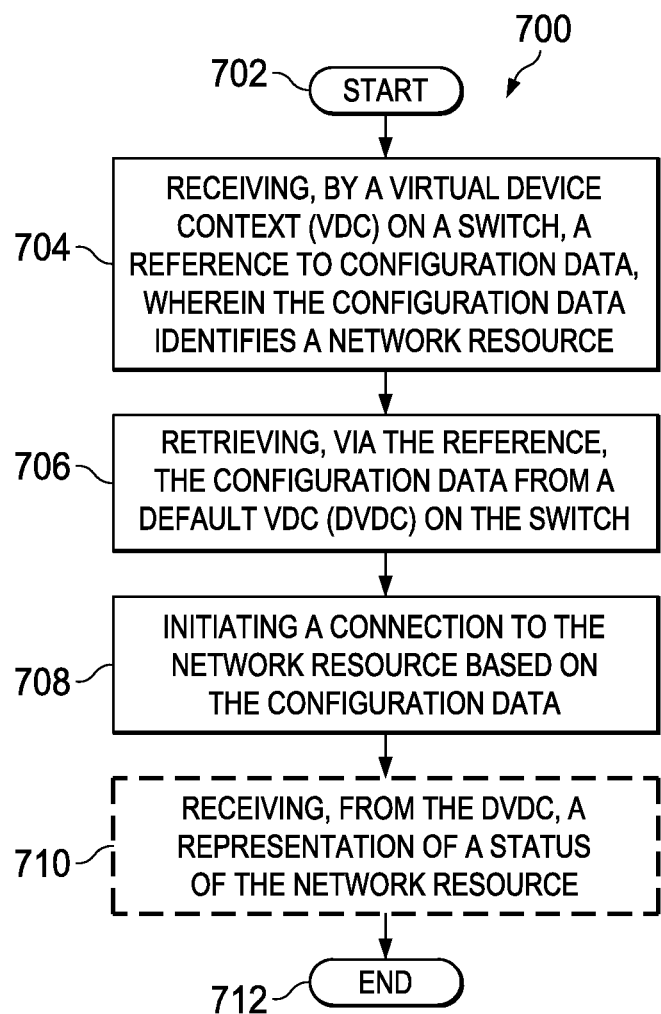

FIGS. 6A, 6B, and 7 illustrate exemplary operations for providing shared resources to virtual devices in accordance with some embodiments of the present disclosure. What follows is a discussion of the FIGS. 6A, 6B, and 7 in the context of FIG. 5B.

FIG. 6A illustrates exemplary logic for providing shared resources to virtual devices in accordance with some embodiments of the present disclosure. Logic 600 begins at 602, which may coincide with a start/end point of other logic, routines, and/or applications. Logic 600 advances from 602 to 604. At 604, a default virtual device context (DVDC) 104 on a switch 22, stores configuration data 34a that identifies a network resource (e.g., server farm 14a). The GISCM 32 in DVDC 104 may store, in the configuration data 34a, a network address of each node in the server farm 14a. At 606, the DVDC 104 on the switch 22 transmits, a reference to the configuration data 34a to a plurality of other virtual device contexts (VDCs) on the switch (e.g., VDCs 100 and 102). The DVDC 104 can utilize the GISCM 32 to transmit the reference, over the communication channels 112a and 112b, to the ISCMs 28a and 28b in VDCs 100 and 102 respectively. The reference may be operable (at least in part) to provide the plurality of other VDCs with access to the configuration data 34a stored by the DVDC 104. Each of plurality of other VDCs receives (e.g., via ISCMs) the reference from the DVDC 104 via the communication channels. At 608, the DVDC 104 provides at least a portion of the configuration data to the one or more of the plurality of other VDCs. For example, one or more of the plurality of other VDCs (e.g., either or both of VDC 100 or VDC 102) may generate a request to establish a connection to the network resource using the reference to the configuration data. The one or more of the plurality of other VDCs transmit the request to the default VDC (e.g., by activating the reference, which initiates a communication over the communication channels 112a and 112b). The DVDC 104 receives, from the one or more of the plurality of other VDCs, the request to access the configuration data (stored by the DVDC 104) via the reference. The DVDC 104 can utilize the GISCM 32 to provide the ISCMs 28a VDCs with access to the configuration data 34a that is stored at the DVDC (e.g., by transmitting a reference to the data to VDCs 28a and 28b over the communication channels 112a and 112b respectively). The DVDC 104 may enable the VDCs 100 and 102 to retrieve (from a memory address in the DVDC 104) and utilizing the configuration data 34a to initiate a connection to the network resource. The VDCs 100 and 102 may initiate a connection with the network resource using the configuration data 34a stored in the DVDC 104. Logic 600 ends at 620, which may coincide with a start/end point of other logic, routines, and/or applications.

In one example, 610 of FIG. 6A coincides with 652 of FIG. 6B such that when the other VDCs are provided with access to the network resource (via the reference to the configuration data), the DVDC initiates providing them with status messages related to the operational status of the network resource.

FIG. 6B illustrates exemplary logic for monitoring shared resources in accordance with some embodiments of the present disclosure. Logic 650 begins at 652, which may coincide with a start/end point of other logic, routines, and/or applications. Logic 650 advances from 652 to 654. At 654, a default virtual device context (DVDC) 104 initiates a probe to a network resource. The probe is operable to retrieve at least an operational status of the resource. The GISCM 32 in DVDC 104 may initiate a probe the server farm 14a. The initiation may comprise generating a message for transmission to the server farm 14a. The message is used to verify that the network resource is reachable (e.g., to determine whether a network connection between the DVDC 104 and the server farm 14a is operating) or may be used to prevent the network connection from being terminated. At 656, the DVDC 104 receives a status from the network resource based on the probe. The status may be a response message or the lack of a response message. For example, when the network resource is operating properly (e.g., with respect to network connectivity), the server farm 14a (e.g., individual nodes in the server farm 14a or each node in the server farm 14a) may generate a response to the message and transmit the response message to the DVDC 104. When the network resource is not operating (or not properly operating) (e.g., with respect to network connectivity), the network resource may not transmit the response message to the DVDC (or may transmit the response message at a time later than the interval of time). In some examples, the DVDC 104 receives the response message from the server farm 14a. The DVDC determines whether the response message to the message is received within an interval of time. At 658, the DVDC 104 transmits a representation of the status to at least one of a plurality of other VDCs on the switch 22. The representation may be a message that identifies, in some form, the status of the network resource and/or a communication channel (or link) to the network resource. For example, when the DVDC determines that the reply message to the message is received within the interval of time (e.g., in a time interval that is equal to or less than the interval of time), the DVDC generates a status message indicating that a link to the network resource is operational. The DVDC transmits to each of the plurality of VDCs the status message indicating that the link is operational. When the DVDC determines that the response message to the message is not received within the interval of time (e.g., in a time interval that is greater than the interval of time, or not received at all), the DVDC generates a status message indicating that the link is not operational the DVDC transmits to each of the plurality of VDCs a second status message indicating that the link is not operational. Logic 650 ends at 660, which may coincide with a start/end point of other logic, routines, and/or applications.

FIG. 7 illustrates exemplary logic for utilizing shared resources in accordance with some embodiments of the present disclosure. Logic 700 begins at 702, which may coincide with a start/end point of other logic, routines, and/or applications. Logic 700 advances from 702 to 704. At 704, a virtual device context (VDC) on a switch receives a reference to configuration data, wherein the configuration data identifies a network resource. For example, the VDC may be either or both of VDC 100 and VDC 102. The VDC may receive, from VDC 104, the reference to configuration data 34a (e.g., when VDC 104 executes 606 of FIG. 6A). The ISCMs 28a and 28b in VDCs 100 and 102 may receive, from the GISCM 32 in DVDC 104, the reference over the communication channels 112a and 112b. The reference may be operable (at least in part) to provide the VDC with access to the configuration data 34a stored by the DVDC 104. At 706, the VDC retrieves, via the reference, the configuration data from a DVDC on the switch. For example, the VDCs 100 and 102 to retrieve (from a memory address in the DVDC 104 by executing the reference) at least a portion of the configuration data 34a (e.g., when the DVDC 104 executes 608 of FIG. 6A). The ISCMs 28a and 28b in VDCs 100 and 102 may retrieve, from the GISCM 32 in DVDC 104, at least a portion of the configuration data 34a over the communication channels 112a and 112b. At 708, the VDC initiates a connection to the network resource based on the configuration data. For example, the VDC may initiate a connection to the network resource utilizing the at least the portion of the configuration data 34a. At 710, the VDC receives, from the DVDC, a representation of a status of the network resources. The ISCMs 28a and 28b in VDCs 100 and 102 may receive, from the GISCM 32 in DVDC 104, the representation over the communication channels 112a and 112b. The representation may be receive when the DVDC 104 executes 658 of FIG. 6B. The representation of the status may include a status message indicating whether the network resource is operational, whether a link to the network resource is operational, or any other message (or non-transitory signal) that identifies an operational state related to the network resource.

In the above examples, the service appliance detects and/or resolves the inconsistencies. In other embodiments, the Global ISCM (GISCM) can also be used to detect the inconsistent configuration by polling the individual ISCMs for their configuration. In further examples, the service appliance work in combination with the GISCM (e.g., the service appliance instructs the GISCM, or vice versa) to detect and/or resolve the inconsistent configurations.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 24 and/or switch 22 (e.g., through various modules, algorithms, processes, etc.). One example is the agent as described herein. In some embodiments, one or more of these features may be implemented in hardware, provided external to these elements, or consolidated in any appropriate manner to achieve the intended functionality. Service appliance 24 and/or switch 22 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 22 and service appliance 24 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 92, memory 88) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 86 and processor 90 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 88, memory 92) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding Figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 may be applicable to other exchanges, formats, or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) or examples. In order to assist the United States Patent and Trademark Office (USPTO) and, additionally, any readers of any patent issued on this application in interpreting the claims or examples appended hereto (if any), Applicant wishes to note that the Applicant: (a) does not intend any of the appended claims or examples (if any) to invoke paragraph six (6) of 35 U.S.C. section 112 as it exists on the date of the filing hereof unless the words "means for" or "step for" are specifically used in the particular claims or examples (if any); and (b) does not intend, by any statement in the specification, to limit this disclosure in any way that is not otherwise reflected in the appended claims.

What is claimed is:

1. A method comprising:
   storing, by a default virtual device context (DVDC) located on a switch, configuration data that identifies a network resource;
   transmitting a reference to the configuration data to a plurality of virtual device contexts (VDCs) located on the switch;
   receiving, from one of the plurality of VDCs, a request to access the configuration data via the reference;
   transmitting, based on the request, at least a portion of the configuration data from the DVDC to the one of the plurality of VDCs, wherein the at least the portion of the configuration data is operable to initiate a connection between the one of the plurality of VDCs and the network resource; and
   providing, by the one of the plurality of VDCs, to a service appliance, different from the network resource, a service slot number by which the service appliance can communicate with the one of the plurality of VDCs such that the service appliance can further communicate with the network resource through the switch.

2. The method of claim 1, wherein the reference is a pointer to a memory address at which the configuration data is stored, and wherein the memory address is located in a memory element associated with the DVDC.

3. The method of claim 2, wherein each of the plurality of VDCs stores the reference and does not store the configuration data.

4. The method of claim 1, further comprising:
   determining, based on a probe implemented by the DVDC, whether the network resource is operational;
   when it is determined that the network resource is operational, transmitting a status of the network resource to the plurality of VDCs; and
   when it is determined that the network resource is not operational, transmitting an error message to the plurality of VDCs, wherein the error message identifies that the network resource is not operational.

5. The method of claim 1, further comprising:
   transmitting, by the DVDC, a keepalive message to the network resource;
   determining, by the DVDC, whether a response message to the keepalive message is received within an interval of time, wherein the interval of time is measured relative to a time at which the keepalive message is transmitted;
   when it is determined that the response message to the keepalive message is received within the interval of time:
      transmitting to each of the plurality of VDCs a first status message indicating that a link to the network resource is operational; and
   when it is determined that the response message to the keepalive message is not received within the interval of time:
      transmitting to each of the plurality of VDCs a second status message indicating that the link is not operational.

6. The method of claim 1, wherein each of the plurality of VDCs and the DVDC is a virtual machine running on the switch.

7. The method of claim 1, further comprising:
   initiating, by the one of the plurality of VDCs, a connection to the network resource using the configuration data stored in the DVDC.

8. A switch comprising:
   at least one memory element;
   at least one processor operably coupled to the at least one memory;
   a plurality of virtual device contexts (VDCs), wherein at least one the plurality of VDCs is associated with a first processor of the at least one processor and a first memory element of the at least one memory element;
   a default virtual device context (DVDC), wherein the DVDC is associated with a second processor of the at least one processor and second memory element of the at least one memory element, and wherein the DVDC comprises one or more instructions, that when executed by the second processor configure the second processor to perform operations comprising:
      storing configuration data that identifies a network resource;
      transmitting a reference to the configuration data to the plurality of VDCs;

receiving, from the at least one of the plurality of VDCs, a request to access the configuration data via the reference;

transmitting, based on the request, at least a portion of the configuration data to the at least one of the plurality of VDCs, wherein the at least the portion of the configuration data is operable to initiate a connection between the at least one of the plurality of VDCs and the network resource; and providing, by the at least one of the plurality of VDCs, to a service appliance, different from the network resource, a service slot number by which the service appliance can communicate with the one of the plurality of VDCs such that the service appliance can further communicate with the network resource through the switch.

9. The switch of claim 8, wherein the reference is a pointer to a memory address at which the configuration data is stored, and wherein the memory address is located in the second memory element associated with the DVDC.

10. The switch of claim 9, wherein each of the plurality of VDCs stores the reference and does not store the configuration data.

11. The switch of claim 8, wherein the operations further comprise:
determining, based on a probe implemented by the DVDC, whether the network resource is operational;
when it is determined that the network resource is operational, transmitting a status of the network resource to the plurality of VDCs; and
when it is determined that the network resource is not operational, transmitting an error message to the plurality of VDCs, wherein the error message identifies that the network resource is not operational.

12. The switch of claim 8, wherein the operations further comprise:
transmitting, by the DVDC, a keepalive message to the network resource;
determining, by the DVDC, whether response message to the keepalive message is received within an interval of time, wherein the interval of time is measured relative to a time at which the keepalive message is transmitted;
when it is determined that the response message to the keepalive message is received within the interval of time:
transmitting to each of the plurality of VDCs a first status message indicating that a link to the network resource is operational; and
when it is determined that the response message to the keepalive message is not received within the interval of time:
transmitting to each of the plurality of VDCs a second status message indicating that the link is not operational.

13. The switch of claim 8, wherein each of the plurality of VDCs and the DVDC is a virtual machine running on the switch.

14. The switch of claim 8, wherein the at least one of the plurality of VDCs comprises one or more instructions, that when executed by the first processor configure the first processor to perform operations comprising:
initiating a connection to the network resource using the configuration data stored in the DVDC.

15. A computer-readable non-transitory medium comprising one or more instructions that, when executed on a processor, configure the processor to perform one or more operations comprising:

storing, by a default virtual device context (DVDC) located on a switch, configuration data that identifies a network resource;

transmitting a reference to the configuration data to a plurality of virtual device contexts (VDCs) located on the switch;

receiving, from one of the plurality of VDCs, a request to access the configuration data via the reference;

transmitting, based on the request, at least a portion of the configuration data from the DVDC to the one of the plurality of VDCs, wherein the at least the portion of the configuration data is operable to initiate a connection between the one of the plurality of VDCs and the network resource; and providing, by the one of the plurality of VDCs, to a service appliance, different from the network resource, a service slot number by which the service appliance can communicate with the one of the plurality of VDCs such that the service appliance can further communicate with the network resource through the switch.

16. The computer-readable non-transitory medium of claim 15, wherein the reference is a pointer to a memory address at which the configuration data is stored, and wherein the memory address is located in a memory element associated with the DVDC.

17. The computer-readable non-transitory medium of claim 15, wherein each of the plurality of VDCs stores the reference and does not store the configuration data.

18. The computer-readable non-transitory medium of claim 15, wherein the operations further comprise:
determining, based on a probe implemented by the DVDC, whether the network resource is operational;
when it is determined that the network resource is operational, transmitting a status of the network resource to the plurality of VDCs; and
when it is determined that the network resource is not operational, transmitting an error message to the plurality of VDCs, wherein the error message identifies that the network resource is not operational.

19. The computer-readable non-transitory medium of claim 15, further comprising:
transmitting, by the DVDC, a keepalive message to the network resource;
determining, by the DVDC, whether a response message to the keepalive message is received within an interval of time, wherein the interval of time is measured relative to a time at which the keepalive message is transmitted;
when it is determined that the response message to the keepalive message is received within the interval of time:
transmitting to each of the plurality of VDCs a first status message indicating that a link to the network resource is operational; and
when it is determined that the response message to the keepalive message is not received within the interval of time:
transmitting to each of the plurality of VDCs a second status message indicating that the link is not operational.

20. The computer-readable non-transitory medium of claim 15, further comprising:
initiating, by the one of the plurality of VDCs, a connection to the network resource using the configuration data stored in the DVDC.

* * * * *